(12) United States Patent
Jin et al.

(10) Patent No.: US 8,362,667 B2
(45) Date of Patent: Jan. 29, 2013

(54) MULTI-STAGE SLIDING STRUCTURE OF HANDHELD DEVICE

(75) Inventors: Wei Jin, Shanghai (CN); Ming Wen, Shanghai (CN)

(73) Assignee: Inventec Appliances Corp., Taipei (TW)

( * ) Notice: Subject to any disclaimer, the term of this patent is extended or adjusted under 35 U.S.C. 154(b) by 583 days.

(21) Appl. No.: 12/558,023

(22) Filed: Sep. 11, 2009

(65) Prior Publication Data

US 2010/0067833 A1    Mar. 18, 2010

(30) Foreign Application Priority Data

Sep. 12, 2008   (TW) ............................... 97216471 U

(51) Int. Cl.
*H04M 1/00*   (2006.01)

(52) U.S. Cl. .................................... 310/90.5; 455/575.4

(58) Field of Classification Search ................ 310/90.5; 455/575.4, 575.1
See application file for complete search history.

(56) References Cited

U.S. PATENT DOCUMENTS

| 2008/0061914 A1* | 3/2008 | Kim et al. ..................... 335/306 |
| 2008/0174392 A1* | 7/2008 | Cho .............................. 335/285 |
| 2008/0182634 A1* | 7/2008 | Cho et al. .................. 455/575.4 |

FOREIGN PATENT DOCUMENTS

| TW | M285859 | 1/2006 |
| TW | M320261 | 10/2007 |

\* cited by examiner

*Primary Examiner* — Dang Le

(74) *Attorney, Agent, or Firm* — Muncy, Geissler, Olds & Lowe, PLLC

(57) ABSTRACT

A multi-stage sliding structure of a handheld device includes a first sliding block, a second sliding block, and an engagement structure. The first sliding block has at least one first groove for containing a first magnetic strip. The second sliding block has at least one second groove. The second groove is for containing at least two second magnetic strips which are continually spaced apart in the second groove, and the directions of magnetic poles of the second magnetic strips correspond with directions of respective magnetic poles of the first magnetic strip. The engagement structure includes two structures disposed near outer sides of the first and the second grooves respectively, and is for enabling the first and the second sliding blocks to engage with each other and slide with respect to each other.

8 Claims, 12 Drawing Sheets

MULTI-STAGE SLIDING STRUCTURE OF HANDHELD DEVICE

CROSS-REFERENCE TO RELATED APPLICATION

This application claims the benefit of Taiwan utility model application No. 097216471, filed on Sep. 12, 2008, which is hereby incorporated by reference for all purposes as if fully set forth herein.

BACKGROUND OF THE INVENTION

1. Field of Invention

The present invention relates to a sliding structure of a handheld device, and more particularly to a multi-stage sliding structure of a handheld device that provides an advantage of multi-stage sliding from the magnetic attraction/repulsion.

2. Related Art

In the prior art, for example, Taiwan, R.O.C. Patent Publication No. M285859 discloses a slidable hinge structure mounted on a handheld electronic device. The slidable hinge structure is formed by a main body and a sliding cover disposed thereon.

The slidable hinge includes a base fixed on the main body and a sliding seat fixed on the sliding cover. The sliding seat is slidably disposed on the base. At least one strip elastic element in a thin sheet shape is pivoted between the base and the sliding seat. The elastic element is formed by multiple continuous S-shaped bent portions, and has a pivoting end on each side. One pivoting end is pivoted to the base through a pivoting element, and the other pivoting end is pivoted to the sliding seat through a pivoting element.

Further, Taiwan, R.O.C Patent Publication No. M320261 discloses a slidable elastic seat structure for a mobile phone. The structure includes an upper cover having a first through-hole and a second through-hole, a lower cover having a third through-hole and a fourth through-hole, and two pillar strip-shaped elastic elements bent in a serpentine shape. The width of the lower cover is slightly smaller than that of the upper cover. The two ends of one elastic element are respectively fixed to the first through-hole on the upper cover and the third through-hole on the lower cover, and the two ends of the other elastic element are respectively fixed to the second through-hole on the upper cover and the fourth through-hole on the lower cover. Thus, the elastic elements are diagonally fixed. When the upper and lower covers slide, the pillar elastic elements and the serpentine-shaped bends generate elastic forces for extending and retracting so as to fold/unfold and slide upper and lower covers.

However, the prior art still has the following inevitable defects:

Firstly, despite its configuration, the elastic element has a certain elastic durability. Once exceeding the durability, the main body of the mobile phone will be loosened from its cover, and the sliding cover cannot stop at a specific position. Besides, the serpentine or S-shaped bends definitely increase the material required to form the elastic element, and thus the cost will rise.

Secondly, if the slidable mobile phone requires additional multi-stage sliding, flanges and ribs need to be designed on the slide rail of the sliding structure of the mobile phone. Thus, for the shell molding operation, a complicated process needs to be added, and the cost is increased. Moreover, the flanges and ribs are easily worn, such that the cover of the mobile phone is difficult to slide and stop at a specific position.

SUMMARY OF THE INVENTION

Accordingly, the present invention is directed to a sliding structure, which is capable of stably stopping at different positions when a sliding cover is sliding on a main body of a mobile phone, does not require complicated manufacturing processes, lowers the cost, and has high durability.

In order to solve the above problem, the technical solution of the present invention provides a multi-stage sliding structure of a handheld device, suitable for allowing a main body and a cover of the handheld device to slide with respect to each other. The multi-stage sliding structure includes a first sliding block, a second sliding block, and an engagement structure.

The first sliding block has at least one first groove for containing a first magnetic strip. The second sliding block has at least one second groove adapted to match the first groove in terms of position and shape. The second groove contains at least two second magnetic strips which are continually spaced apart in the second groove, and the directions of magnetic poles of the second magnetic strips correspond with directions of respective magnetic poles of the first magnetic strip. The engagement structure comprises a first structure of the first sliding block and a second structure of the second sliding block matching the first structure. The two structures are disposed on outer sides of the first groove and the second groove respectively, and the engagement structure is for enabling the first and the second sliding blocks to engage with each other and slide with respect to each other.

In the multi-stage sliding structure of a handheld device provided by the present invention, the first sliding block is disposed on the cover and the second sliding block is disposed on the main body, or the second sliding block is disposed on the cover and the first sliding block is disposed on the main body.

In the multi-stage sliding structure of a handheld device provided by the present invention, the first groove, the second groove, the first magnetic strip, and the second magnetic strips are all substantially linear, or the first groove, the second groove, the first magnetic strip, and the second magnetic strips are all arc-shaped with the same radian. In addition, the second magnetic strips have substantially the same length or different lengths In order to solve the above problem, the technical solution of the present invention provides another multi-stage sliding structure of a handheld device, suitable for allowing a main body and a cover of the handheld device to slide with respect to each other. The multi-stage sliding structure includes a first sliding block, a second sliding block, and an engagement structure.

The first sliding block has a linear first groove for containing a first magnetic strip. The second sliding block has an annular second groove for containing two arc-shaped second magnetic strips which are opposite to each other and spaced apart in the second groove, and two ends of the first magnetic strip are fit to be disposed respectively in two positions corresponding to spaces between the second magnetic strips. The engagement structure comprises a first structure of the first sliding block and a second structure of the second sliding block matching the first structure. The two structures are suitable for engaging with each other to enable the first sliding block to engage with the second sliding block, and rotatably slide along an outer periphery of the second groove with respect to the second sliding block, such that the two ends of the first magnetic strip are fit to be stably disposed respectively in two positions corresponding to the spaces between the second magnetic strips.

In the multi-stage sliding structure of a handheld device provided by the present invention, the first sliding block is disposed on the cover and the second sliding block is disposed on the main body, or the second sliding block is disposed on the cover and the first sliding block is disposed on the main body.

The present invention achieves the following efficacies superior to the prior art.

Firstly, through the magnetic repulsion/attraction between the first and the second magnetic strips, when the first and the second sliding blocks slide with respect to each other, the length of the magnetic strips can be designed to allow the first sliding block to stop at different specific positions. Thus, the elastic element is not needed, and elastic fatigue can be avoided.

Secondly, through the magnetic repulsion/attraction between the first and the second magnetic strips, the purpose of multi-stage stop can be achieved, such that there is no need to configure flanges and ribs on the slide rail of the sliding structure. Thus, in the structure forming, the manufacturing process is simplified, and the cost is lowered. Besides, the abrasion of the flanges and ribs is avoided.

Thirdly, the magnetic strips can be designed in accordance with the sliding mode of the two sliding blocks, and compared with the elastic elements (for example, springs), the magnetic strips are smaller in volume and area. Thus, the handheld device is made even thinner. Moreover, other components or functional modules like circuits or antennas can be configured to further improve the applicability of the handheld device.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

In order to make the objectives, structural features, and functions of the present invention more comprehensible, embodiments with Figures are described in detail below.

Figure 1:
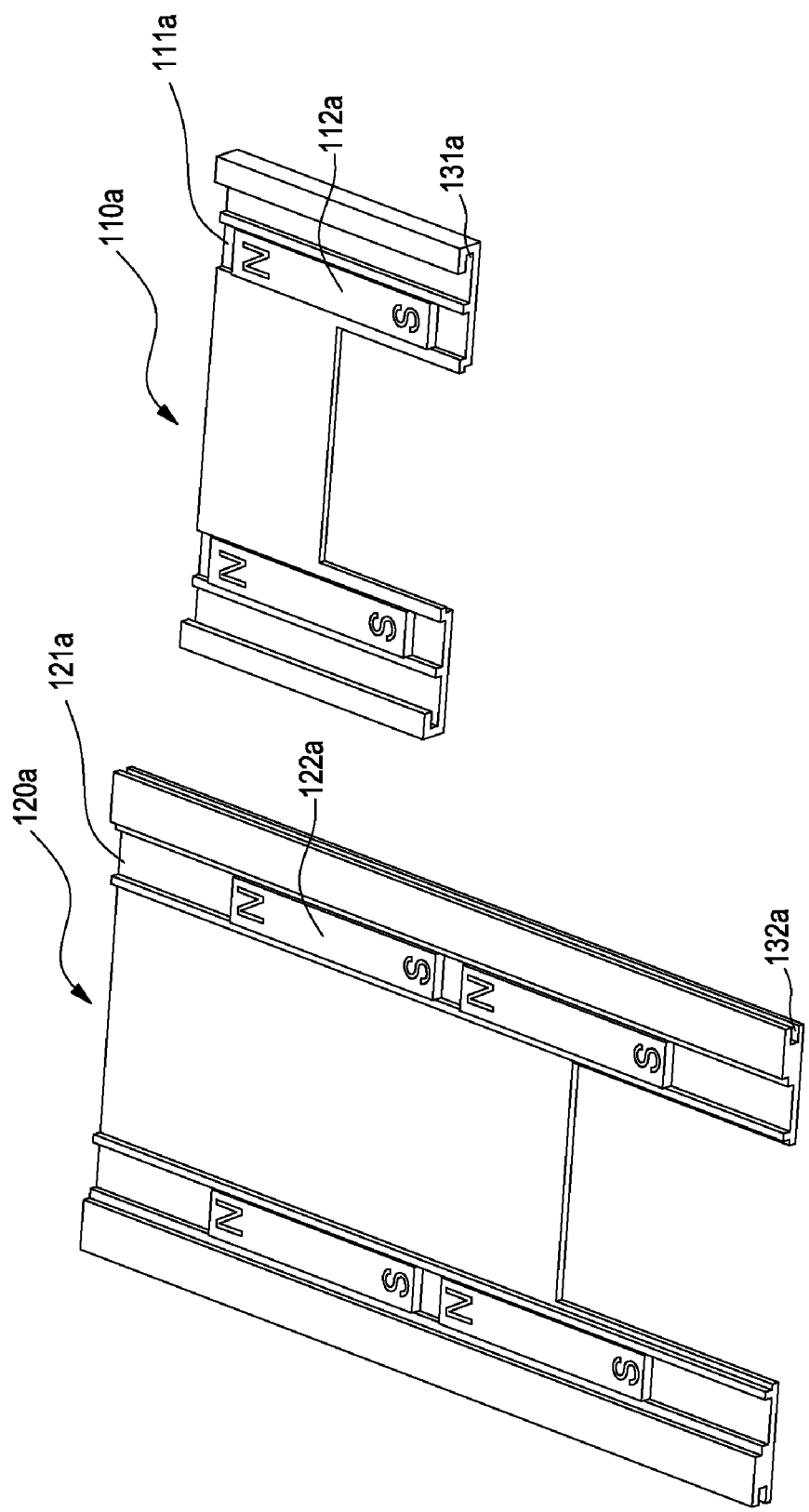
FIG. 1 is a graphical picture of a sliding structure according to a first embodiment of the present invention.
Figure 1A:
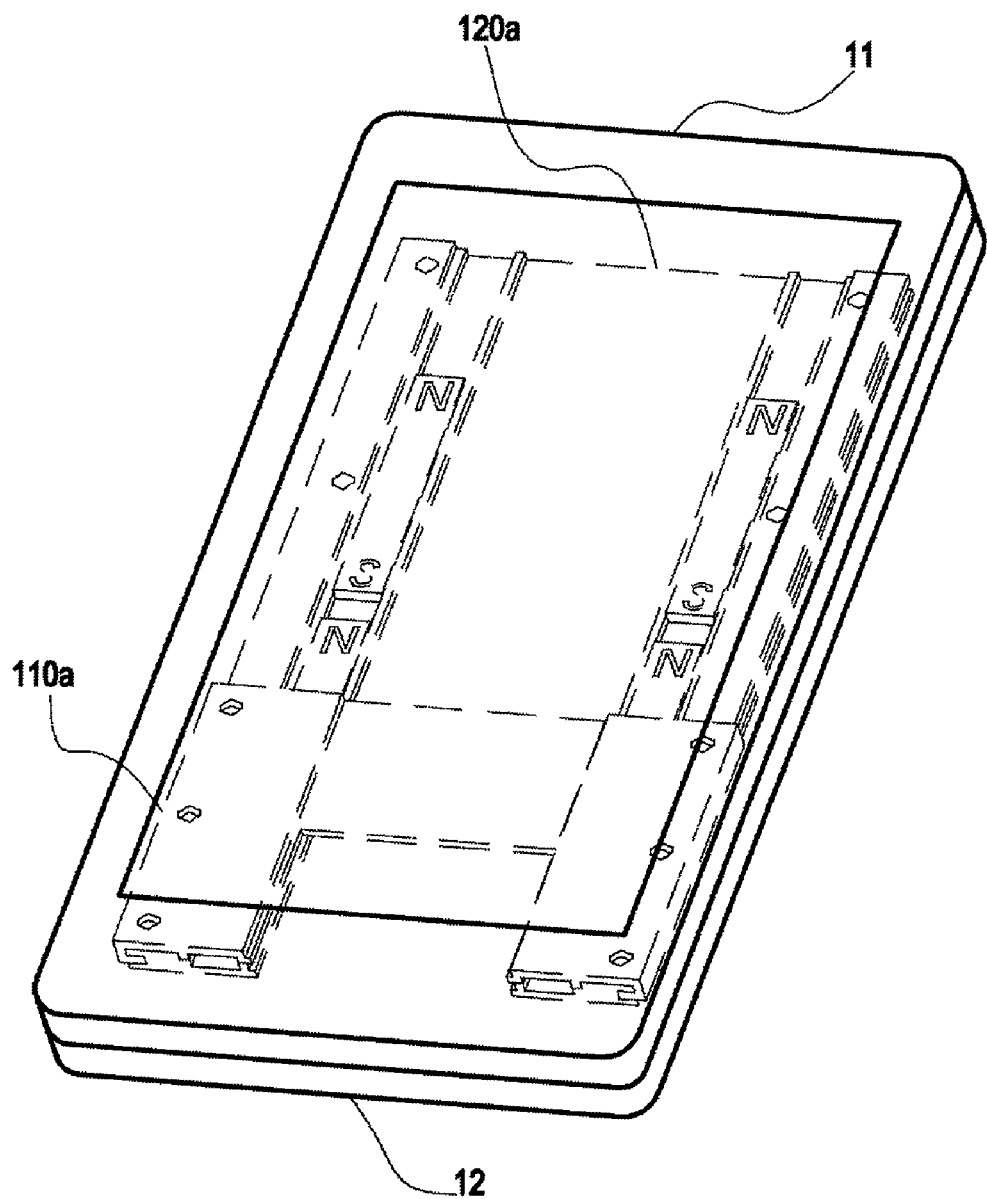
FIG. 1A is a graphical picture showing the second sliding block is disposed on the cover of the handheld device, and the first sliding block is disposed on the main body of the handheld device according to the first embodiment of the present invention.
Figure 1B:
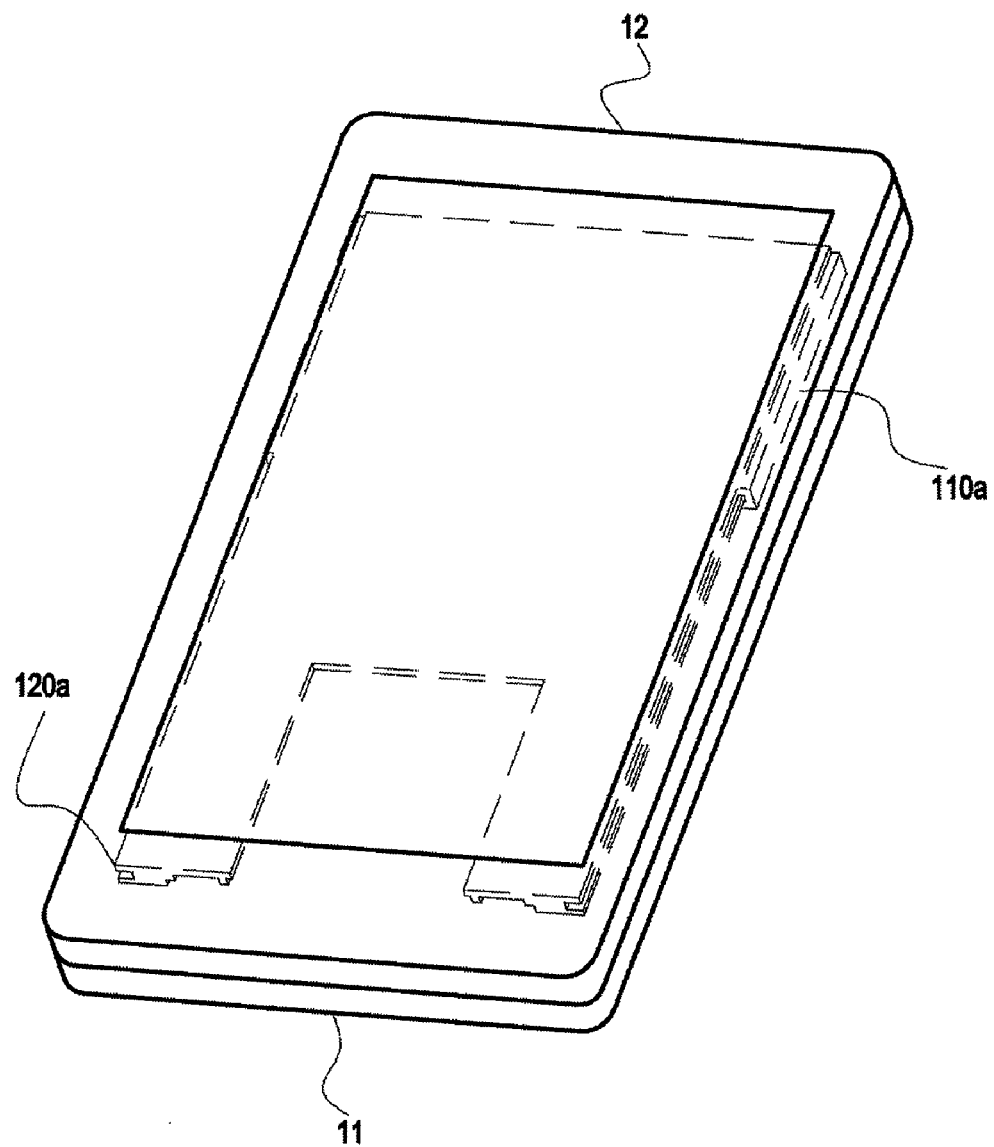
FIG. 1B is a graphical picture showing the second sliding block is disposed on the cover of the handheld device, and the first sliding block is disposed on the main body of the handheld device according to the first embodiment of the present invention.

FIG. 1 is a graphical picture of a sliding structure according to a first embodiment of the present invention. FIG. 1A and FIG. 1B are graphical pictures showing the sliding blocks are disposed on the cover and main body of the handheld device according to the first embodiment of the present invention. The sliding structure includes a first sliding block 110a, a second sliding block 120a, and an engagement structure. In this embodiment, the first sliding block 110a and the second sliding block 120a are, for example, reverse U-shaped, and the reverse U-shaped design matches the shape of the handheld device. The first sliding block 110a has first grooves 111a disposed on both sides of the first sliding block 110a, and each first groove 111a has a first magnetic strip 112a, which matches the first groove 111a in terms of shape.

The second sliding block 120a has second grooves 121a on both sides of the second sliding block 120a, and each second groove 121a has at least two second magnetic strips 122a, each of which matches the second groove 121a in terms of shape. Besides, the position and shape of the second groove 121a also match that of the first groove 111a. In addition, the second magnetic strips 122a are continually spaced apart in each second groove 121a, and there is unoccupied space between the opening at the top or bottom of the second groove 121a and an end of the second magnetic strip 122a adjacent to the opening.

The engagement structure comprises slide rails 132a and hook portions 131a matching the respective slide rails 132a. It is noted from FIG. 1 that the slide rails 132a are disposed on two sides of the second sliding block 120a or on respective outer sides of the second grooves 121a. The hook portions 131a are disposed on two sides of the first sliding block 110a or on respective outer sides of the first grooves 111a. The slide rail 132a can engage with the respective hook portion 131a. Thus, the first sliding block 110a can engage with the second sliding block 120a through the engagement of the hook portion 131a with the respective slide rail 132a. However, the engagement of the first sliding block 110a with the second sliding block 120a is not fixed firmly, and the hook portion 131a can slide in the slide rail 132a. In other words, the engagement structure is used for enabling the first sliding block 110a and the second sliding block 120a to engage with each other and slide with respect to each other.

In FIG. 1, the two first grooves 111a on the first sliding block 110a contain the first magnetic strips 112a respectively, with the two first magnetic strips 112a arranged symmetrically. Similarly, the two second grooves 121a on the second sliding block 120a contain two second magnetic strips 122a, which are also arranged symmetrically. The first groove 111a, the second groove 121a, the first magnetic strip 112a, and the second magnetic strips 122a are all substantially linear in shape, and the width between the two first grooves 111a is substantially the same as the width between the two second grooves 121a. The directions of magnetic poles of the first magnetic strip 112a correspond with the directions of respective magnetic poles of the second magnetic strips 122a. For example, the directions of magnetic poles may be set such that the N-poles are on the upper side and the S-poles are on the lower side or vice versa (in this embodiment, the N-poles are on the upper side and the S-poles are on the lower side, for example).

Thus, after the first sliding block 110a and the second sliding block 120a engage with each other through the engagement of the hook portion 131a with the slide rail 132a (that is, the engagement structure), the position of the first groove 111a corresponds to the respective second groove 121a. When the first sliding block 110a slides with respect to the second sliding block 120a, the first sliding block 110a can stop at a specific position with respect to the second sliding block 120a due to the attraction or repulsion between the magnetic poles of the first magnetic strip 112a and the magnetic poles of at least one of the corresponding second magnetic strips 122a.

Further, the first sliding block 110a may be disposed on the cover 11 of the handheld device, and the second sliding block 120a may be disposed on the main body 12 of the handheld device. On the contrary, the second sliding block 120a may be disposed on the cover 11 of the handheld device, and the first sliding block 110a may be disposed on the main body 12 of the handheld device.

However, with enough magnetic pole attraction or repulsion and engagement force of the engagement structure, the first sliding block 110a and the second sliding block 120a may have a single first groove 111a and a single second groove 121a respectively which match each other in terms of position and shape. Meanwhile, the engagement structure may have a single hook portion 131a and a single corresponding slide rail 132a which match each other in terms of position and shape.

Figure 2:
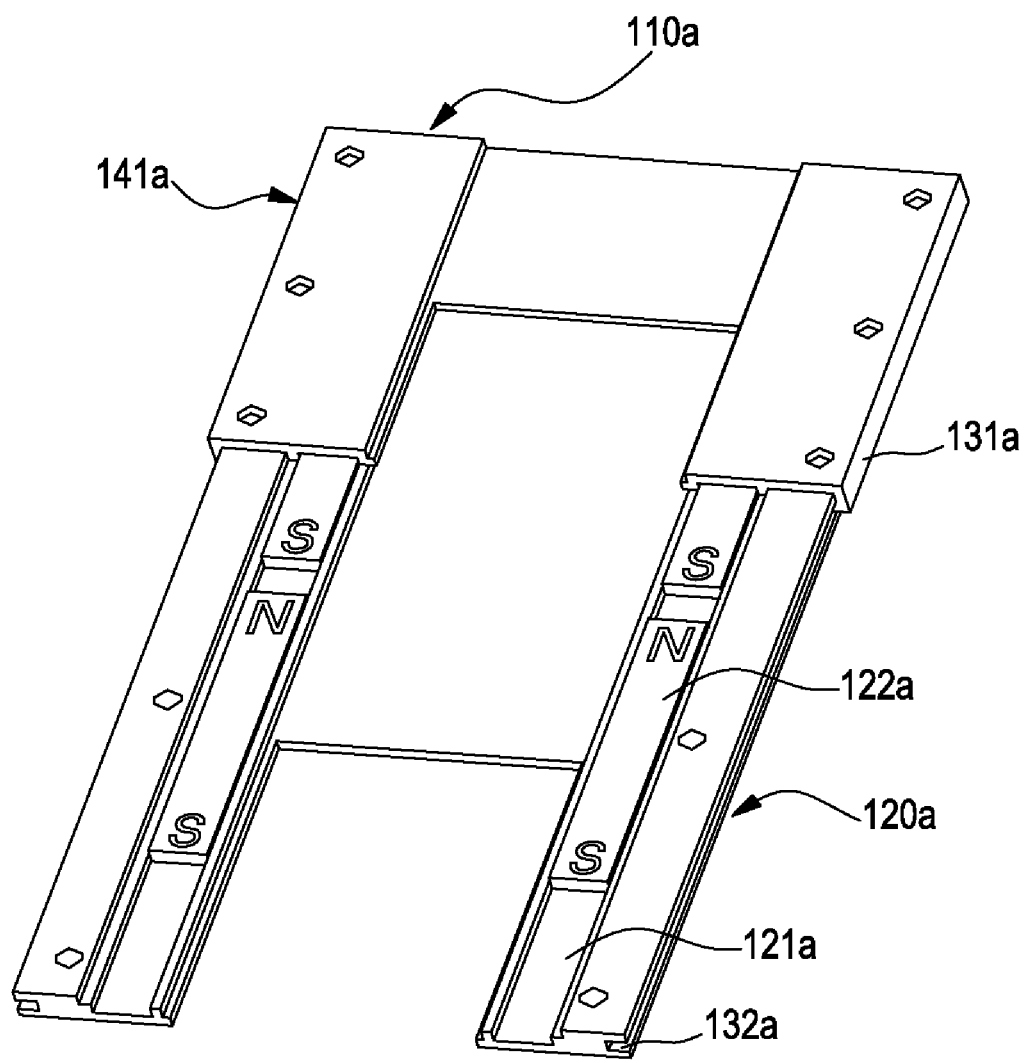
FIG. 2 is a graphical picture showing a first sliding block stops at a first position according to the first embodiment of the present invention.

FIG. 2 is a graphical picture showing the first sliding block 110a stops at a first position 141a according to the first embodiment of the present invention.

In each second groove 121a of the second sliding block 120a, there is unoccupied space between the opening at the top end of the second groove 121a and a top end of the second magnetic strip 122a on the upper side adjacent to the opening. When the first sliding block 110a slides to the first position 141a, the positions of the N-poles of the two first magnetic strips 112a are corresponding to the two unoccupied spaces connecting to the top openings of the two second grooves 121a, respectively. In this case, by way of repulsion between the same magnetic poles, the N-poles of the second magnetic strips 122a on the upper side repel or push against the N-poles of the first magnetic strips 112a respectively. Meanwhile, the S-poles of the second magnetic strips 122a on the upper side repel or push against the S-poles of the first magnetic strips 112a respectively as well. Therefore, the first sliding block 110a stops at the first position 141a due to the above two cases of magnetic pole repulsion being used to push against the first magnetic strips 112a.

Figure 3:
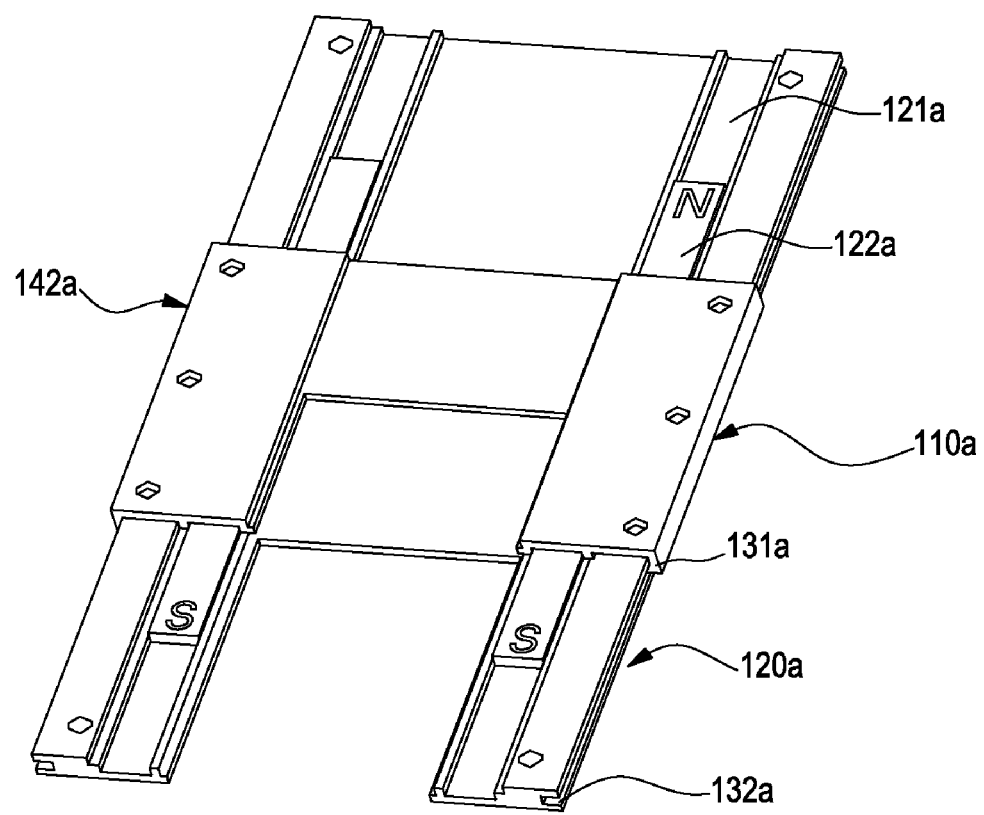
FIG. 3 is a graphical picture showing the first sliding block stops at a second position according to the first embodiment of the present invention.

FIG. 3 is a graphical picture showing the first sliding block 110a stops at a second position 142a according to the first embodiment of the present invention.

When the first sliding block 110a slides to the second position 142a, the positions of the N-poles of the two first magnetic strips 112a are substantially corresponding to that of the S-poles of the second magnetic strips 122a on the upper side in the two second grooves 121a, respectively. However, in each of the two second grooves 121a, the second magnetic strip 122a on the upper side and the second magnetic strip 122a on the lower side are spaced apart, so the repulsion between the N-pole of the second magnetic strip 122a on the lower side and the N-pole of the first magnetic strip 112a is limited. Therefore, by way of the attraction between different magnetic poles, the N-poles of the first magnetic strips 112a are closely attracted, respectively, by the S-poles of the second magnetic strips 122a on the upper side in the second grooves 121a, such that the first sliding block 110a stably stops at the second position 142a.

Figure 4:
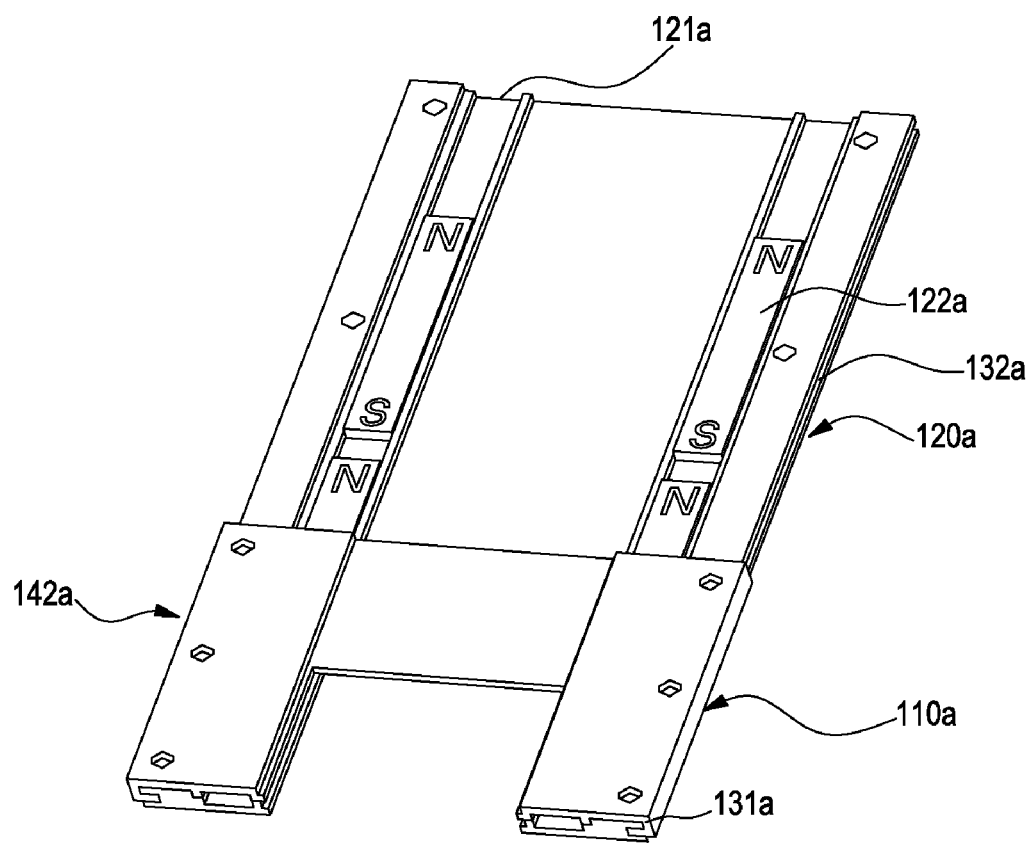
FIG. 4 is a graphical picture showing the first sliding block stops at a third position according to the first embodiment of the present invention.

FIG. 4 is a graphical picture showing the first sliding block 110a stops at a third position 143a according to the first embodiment of the present invention. Referring to FIGS. 4 and 2, the application principle of the magnetic poles in FIG. 4 is similar to that in FIG. 2.

In each second groove 121a of the second sliding block 120a, there is unoccupied space between the opening at the bottom end of the second groove 121a and a bottom end of the second magnetic strip 122a on the lower side adjacent to the opening. When the first sliding block 110a slides to the third position 143a, the positions of the S-poles of the two first magnetic strips 112a are corresponding to the two unoccupied spaces connecting to the bottom openings of the two second grooves 121a respectively. In this case, by way of repulsion between the same magnetic poles, the S-poles of the second magnetic strips 122a on the lower side repel or push against the S-poles of the first magnetic strips 112a respectively. Meanwhile, the N-poles of the second magnetic strips 122a on the lower side repel or push against the N-poles of the first magnetic strips 112a respectively as well. Therefore, the first sliding block 110a stops at the third position 143a due to the above two cases of magnetic pole repulsion being used to push against the first magnetic strips 112a.

Further, the two second magnetic strips 122a in each second groove 121a may be designed to have different lengths depending on design need. However, the second magnetic strips 122a should still be arranged symmetrically, in terms of size and position, between the two second grooves 121a.

Moreover, in each second groove 121a of the second sliding block 120a, the space between the second magnetic strip 122a on the upper side and the second magnetic strip 122a on the lower side may be approximately equal to the length of the first magnetic strip 112a. Therefore, when the first sliding block 110a slides to the second position 142a, in each second groove 121a, the S-pole of the second magnetic strip 122a on the upper side attracts the N-pole of the first magnetic strip 112a, and meanwhile the N-pole of the second magnetic strip 122a on the lower side attracts the S-pole of the first magnetic strip 112a, so as to enhance the attraction to the first sliding block 110a, and thereby the first sliding block 110a stably stops at the second position 142a with respect to the second sliding block 120a.

Figure 5:
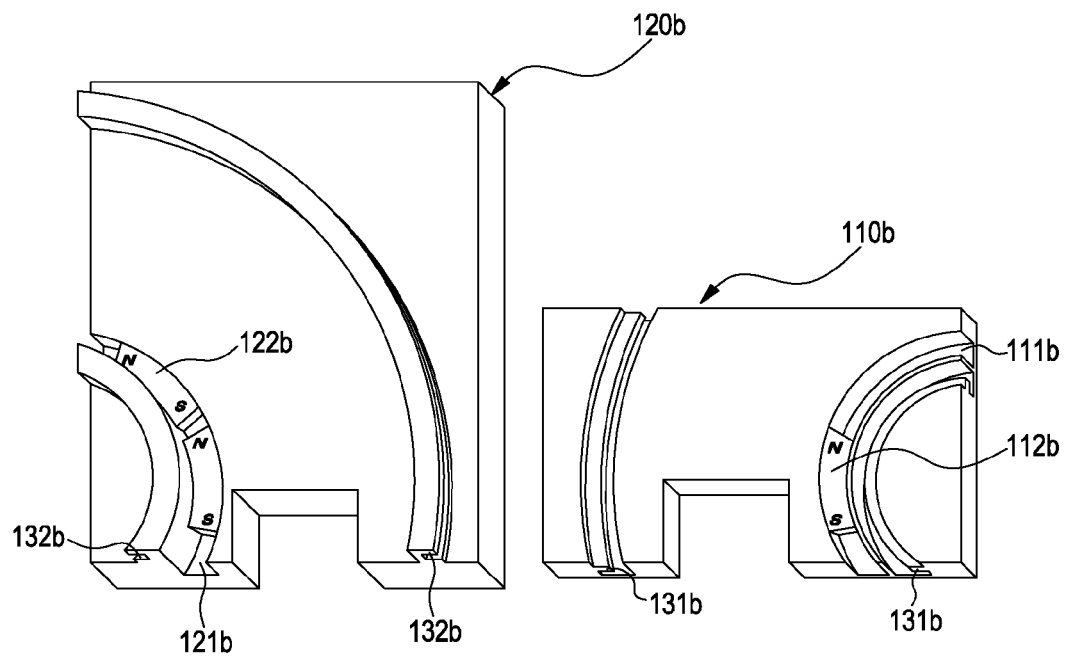
FIG. 5 is a graphical picture of a sliding structure according to a second embodiment of the present invention.
Figure 5A:
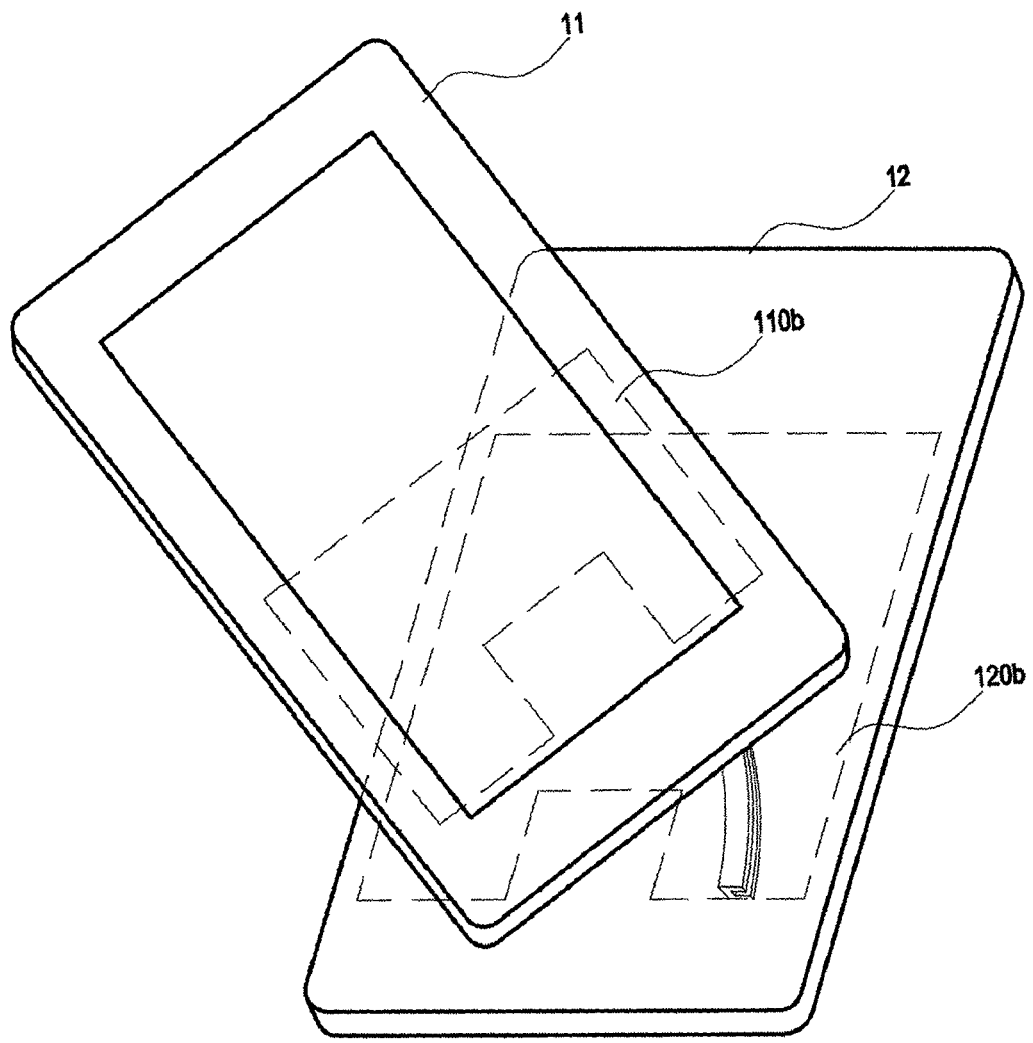
FIG. 5A is a graphical picture showing the second sliding block is disposed on the cover of the handheld device, and the first sliding block is disposed on the main body of the handheld device according to the second embodiment of the present invention.
Figure 5B:
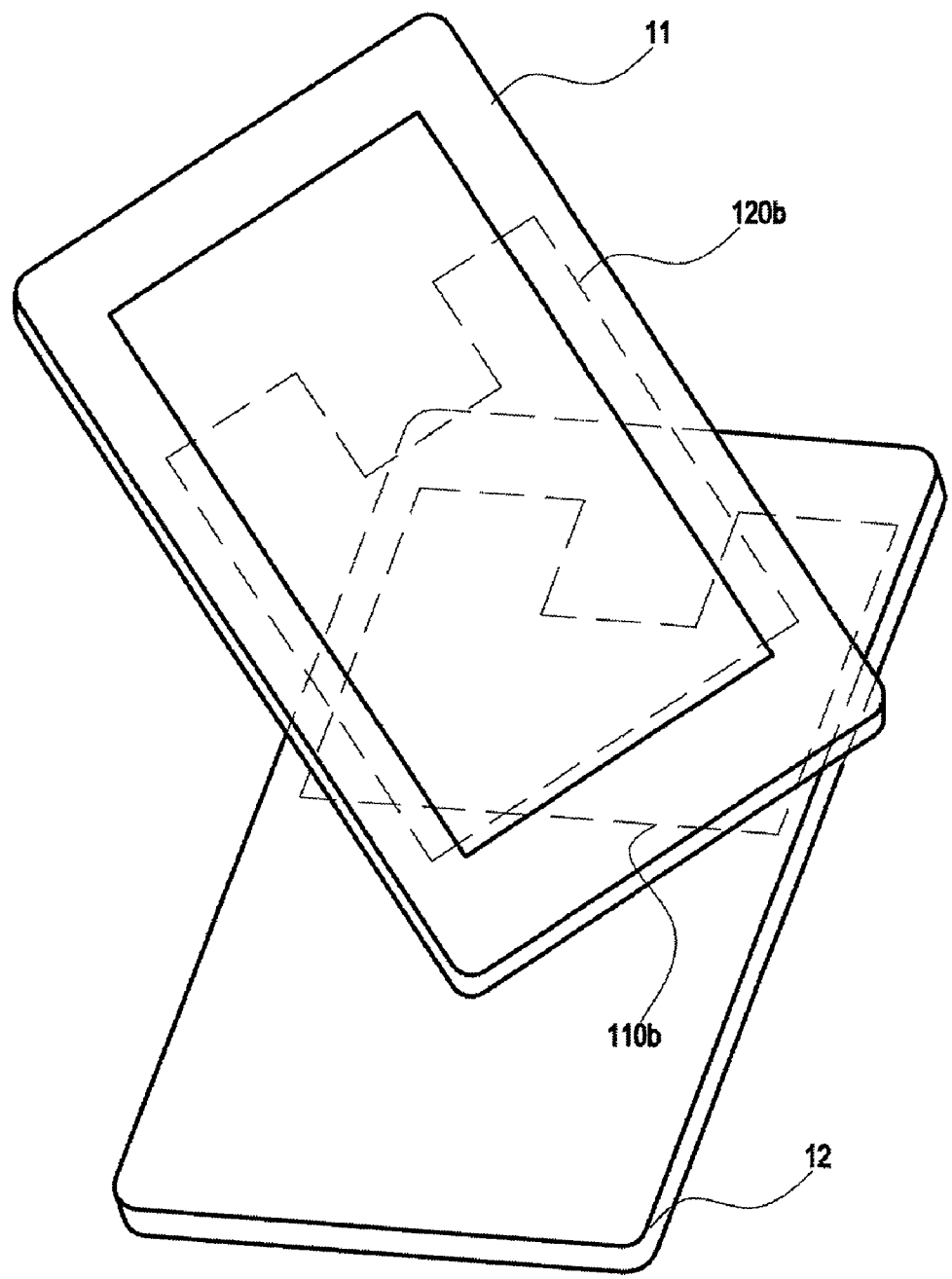
FIG. 5B is a graphical picture showing the second sliding block is disposed on the cover of the handheld device, and the first sliding block is disposed on the main body of the handheld device according to the second embodiment of the present invention.

FIG. 5 is a graphical picture of a sliding structure according to a second embodiment of the present invention. FIG. 5A and FIG. 5B are graphical pictures showing the sliding blocks are disposed on the cover and main body of the handheld device according to the second embodiment of the present invention. The difference between this embodiment and the previous one can be known by referring to FIGS. 5 and 1 together. Here, the sliding structure also includes a first sliding block 110b, a second sliding block 120b, and an engagement structure.

In this embodiment, the first sliding block 110b only has one first groove 111b, and the first groove 111b contains a first magnetic strip 112b which matches the first groove 111b in terms of shape.

Similarly, the second sliding block 120b has only one second groove 121b, and the second groove 121b contains at least two second magnetic strips 122b each of which matches the second groove 121b in terms of shape. The second magnetic strips 122b are continually spaced apart in the second groove 121b, and there is unoccupied space between the opening at the top or bottom of the second groove 121b and an end of the second magnetic strip 122b adjacent to the opening.

The engagement structure comprises two slide rails 132b and two hook portions 131b. It can be known from FIG. 5 that the two slide rails 132b are disposed on the second sliding block 120b, and the two hook portions 131b are disposed on the first sliding block 110b. The hook portions 131b match the slide rails 132b respectively in terms of position and shape, and the hook portions 131b can engage with the corresponding slide rails 132b. Thus, the first sliding block 110b can engage with the second sliding block 120b through the engagement of the hook portions 131b with the slide rails 132b. However, the engagement of the first sliding block 110b with the second sliding block 120b is not fixed firmly, and the hook portion 131b can slide in the slide rail 132b. Therefore, the first sliding block 110b and the second sliding block 120b can engage with each other and slide along each other.

It is known from FIG. 5 that the first groove 111b, the second groove 121b, the first magnetic strip 112b, and the second magnetic strips 122b are all arc-shaped with the same radian, and the radian and width of the first groove 111b are substantially equal to those of the second groove 121b. The directions of the magnetic poles of the first magnetic strip 112b correspond with the directions of respective magnetic poles of the second magnetic strips 122b. For example, the directions of the magnetic poles may be set such that the N-poles are on the upper side and the S-poles are on the lower side or vice versa (in this embodiment, the N-poles are on the upper side and the S-poles are on the lower side).

Thus, after the first sliding block 110b and the second sliding block 120b engage with each other through the engagement of the hook portion 131b and the slide rail 132b (that is, the engagement structure), the position of the first groove 111b corresponds to the second groove 121b, and the position of the first magnetic strip 112b can correspond to that of the second magnetic strips 122b in the second groove 121b. When the first sliding block 110b slides with respect to the second sliding block 120b, the first sliding block 110b can stop at a specific position with respect to the second sliding block 120b due to the attraction or repulsion between the magnetic poles of the first magnetic strip 112b and the magnetic poles of at least one of the second magnetic strips 122b.

Further, the first sliding block 110b may be disposed on the cover 11 of the handheld device, and the second sliding block 120b may be disposed on the main body 12 of the handheld device. On the contrary, the second sliding block 120b may be disposed on the cover 11 of the handheld device, and the first sliding block 110b may be disposed on the main body 12 of the handheld device.

However, in order to improve the magnetic pole attraction or repulsion and engagement force of the engagement structure, the first sliding block 110b and the second sliding block 120b can have multiple first grooves 111b and second grooves 121b which match the first grooves 111b in terms of position and shape. Besides, in order to save the cost while not affecting the engagement forces, the engagement structure may be designed to have a single hook portion 131b and a single slide rail 132b matching each other in terms of position and shape.

Figure 6:
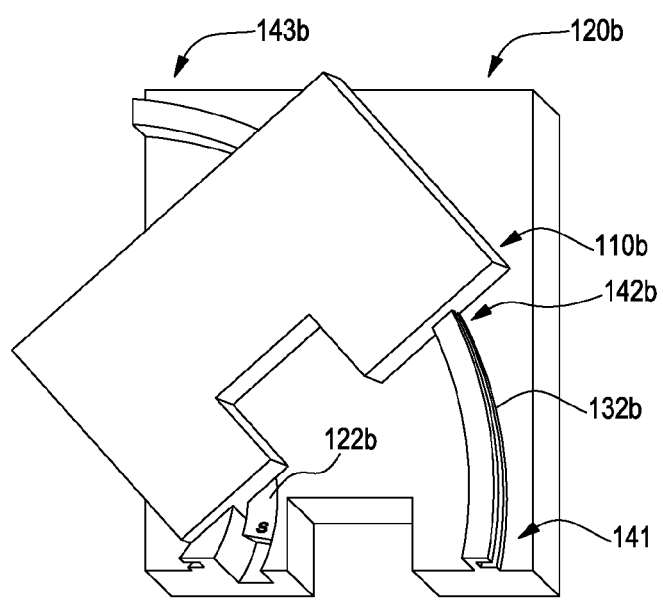
FIG. 6 is a graphical picture of the sliding movement of the sliding structure when it slides according to the second embodiment of the present invention.

FIG. 6 is a graphical picture of the sliding movement of the sliding structure according to the second embodiment of the present invention.

With reference to FIG. 5, in the second groove 121b of the second sliding block 120b, there is unoccupied space between the opening at the left end of the second groove 121b and a top end of the second magnetic strip 122b on the upper side adjacent to the left opening, and there is unoccupied space between the opening at the bottom end of the second groove 121b and a bottom end of the second magnetic strip 122b on the lower side adjacent to the bottom opening. With reference to FIGS. 5 and 6, when the first sliding block 110b slides to a first position 141b, the position of the S-pole of the first magnetic strip 112b is corresponding to the unoccupied space connecting to the bottom opening of the second groove 121b. At this time, by way of repulsion between the same magnetic poles, the N-pole of the second magnetic strip 122b on the lower side in FIG. 5 repels or pushes against the N-pole of the first magnetic strip 112b. Meanwhile, the S-pole of the second magnetic strip 122b on the lower side repels or pushes against the S-pole of the first magnetic strip 112b as well. Therefore, the first sliding block 110b stops at the first position 141b due to the above two cases of magnetic pole repulsion being used to push against the first magnetic strips 112b.

When the first sliding block 110b slides to a second position 142b, the position of the N-pole of the first magnetic strip 112b is substantially corresponding to that of the S-pole of the second magnetic strip 122b on the upper side in the second groove 121b in FIG. 5. However, referring to FIG. 5, in the second groove 121b of the second sliding block 120b, the second magnetic strip 122b on the upper side and the second magnetic strip 122b on the lower side are spaced apart, so the repulsion between the N-pole of the second magnetic strip 122b on the lower side and the N-pole of the first magnetic strip 112b is limited. Therefore, by way of the attraction between different magnetic poles, the N-pole of the first magnetic strip 112b is closely attracted by the S-pole of the second magnetic strip 122b on the upper side in the second groove 121b, Such that the first sliding block 110b stably stops at the second position 142b with respect to the second sliding block 120b.

When the first sliding block 110b slides to a third position 143b, the position of the N-pole of the first magnetic strip 112b is substantially corresponding to the unoccupied space between the top end of the second magnetic strip 122b on the upper side and the left opening of the second groove 121b, and the position of the S-pole of the first magnetic strip 112b is corresponding to a position between the N-pole and the S-pole of the second magnetic strip 122b on the upper side. In this case, by way of repulsion between the same magnetic poles, the S-pole of the second magnetic strip 122b on the upper side repels or pushes against the S-pole of the first magnetic strip 112b. Meanwhile, the N-pole of the second magnetic strip 122b on the upper side repels or pushes against the N-pole of the first magnetic strip 112b as well. Therefore, the first sliding block 110b stops at the third position 143b due to the above two cases of magnetic pole repulsion being used to push against the first magnetic strip 112b.

Figure 7:
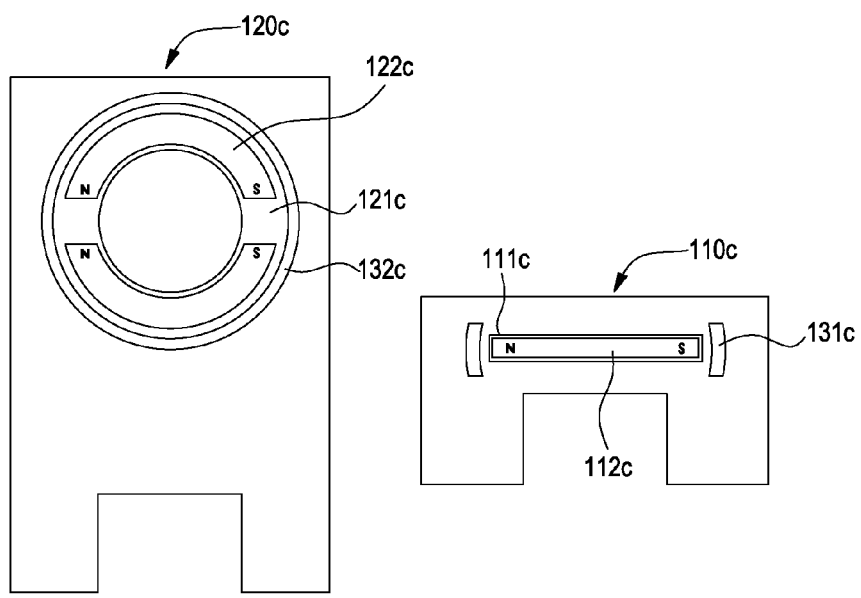
FIG. 7 is a graphical picture of a sliding structure according to a third embodiment of the present invention.
Figure 7A:
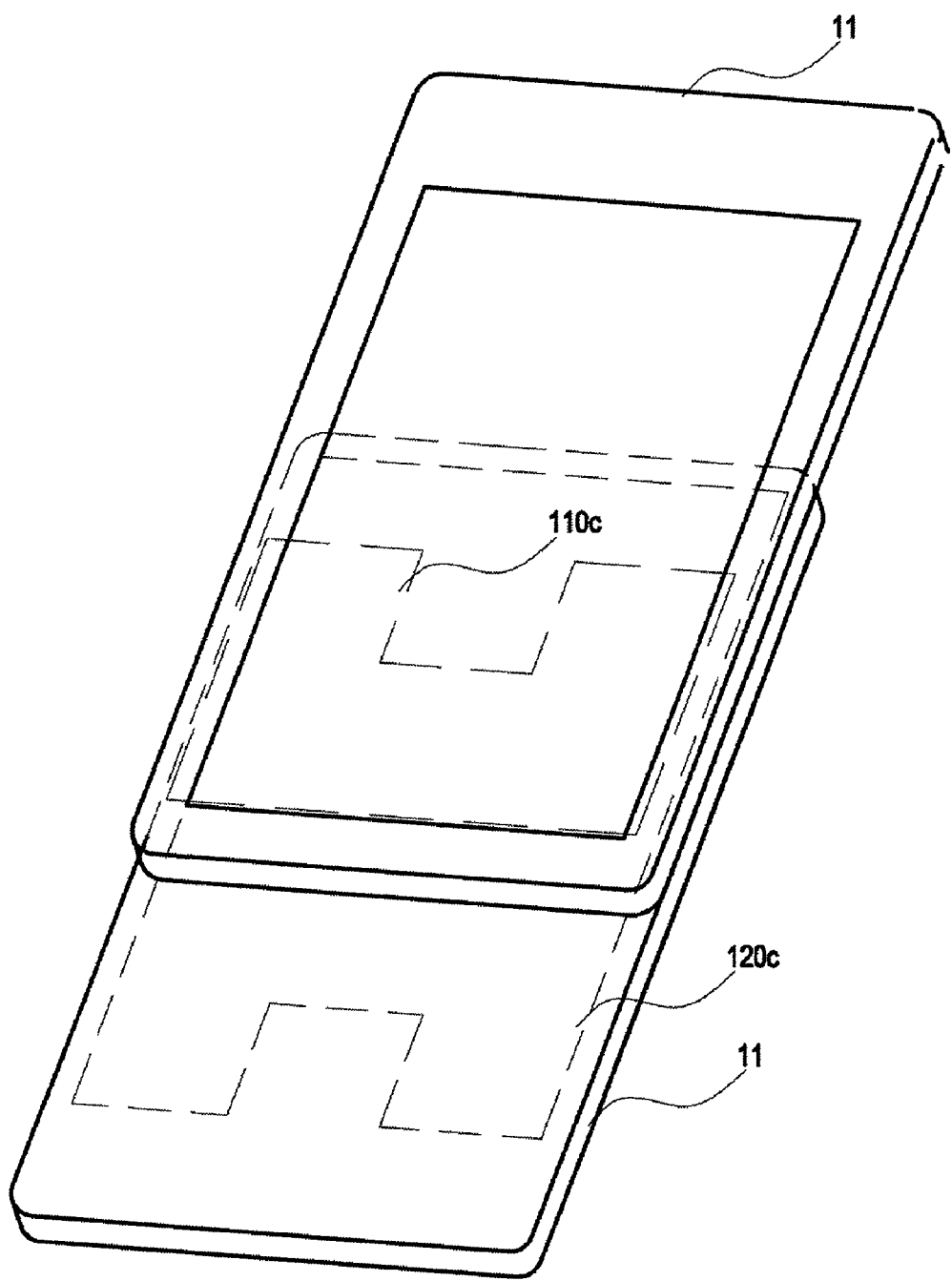
FIG. 7A is a graphical picture showing the second sliding block is disposed on the cover of the handheld device, and the first sliding block is disposed on the main body of the handheld device according to the third embodiment of the present invention.
Figure 7B:
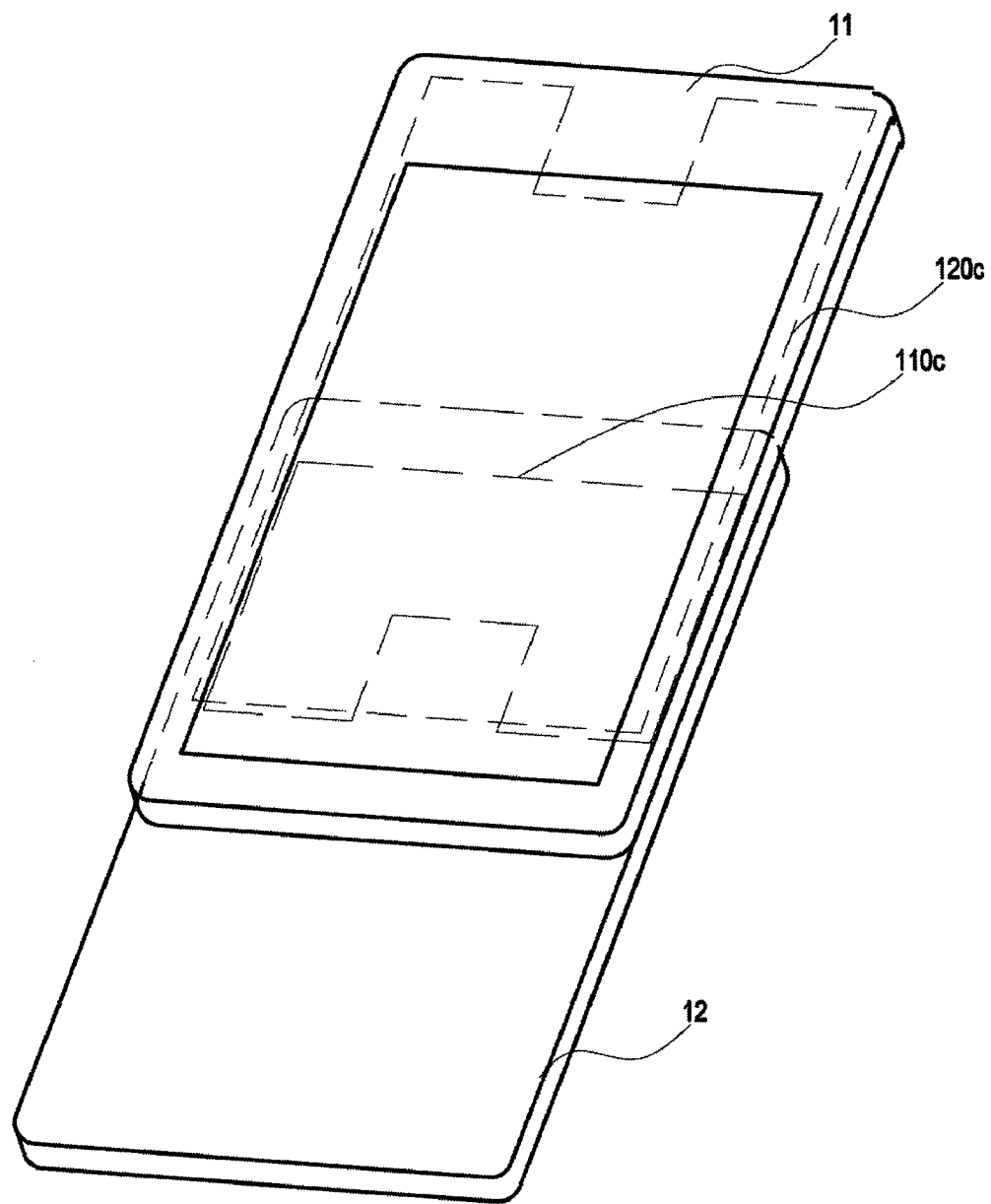
FIG. 7B is a graphical picture showing the second sliding block is disposed on the cover of the handheld device, and the first sliding block is disposed on the main body of the handheld device according to the third embodiment of the present invention.

FIG. 7 is a graphical picture of a sliding structure according to a third embodiment of the present invention. FIG. 7A and FIG. 7B are graphical pictures showing the sliding blocks are disposed on the cover 11 and main body 12 of the handheld device according to the third embodiment of the present invention. Similarly, the sliding structure also includes a first sliding block 110c, a second sliding block 120c, and an engagement structure.

The first sliding block 110c has a linear first groove 111c, and the first groove 111c contains a linear first magnetic strip 112c matching the first groove 111c in terms of shape.

The second sliding block 120c has an annular second groove 121c, and the second groove 121c contains two arc-shaped second magnetic strips 122c. The two second magnetic strips 122c are disposed to be opposite to each other and spaced apart in the second groove 121c with the same magnetic pole direction, and two ends of the first magnetic strips 112c are fit to be disposed respectively in two positions corresponding to spaces between the two second magnetic strips 122c.

The engagement structure comprises two hook portions 131c and a slide rail 132c matching the hook portions 131c. The hook portions 131c are disposed on an outer side of the two ends of the first groove 111c respectively, and the slide rail 132c is disposed surrounding an outer side of the second groove 121c. The hook portions 131c and the slide rail 132c are suitable for engaging with each other to enable the first sliding block 110c to engage with the second sliding block 120c and rotatably slide along an outer periphery of the second groove 121c with respect to the second sliding block 120c.

Figures 8, 9:
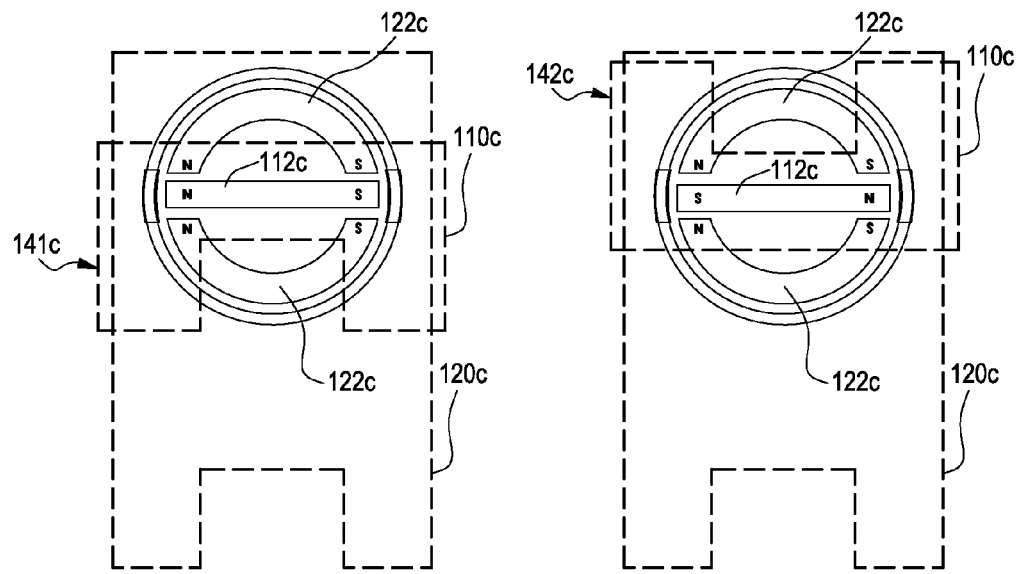
FIG. 8 is a graphical picture showing a first sliding block stops at a first position according to the third embodiment of the present invention.
FIG. 9 is a graphical picture showing the first sliding block stops at a second position according to the third embodiment of the present invention.

FIG. 8 is a graphical picture showing the first sliding block 110c stops at a first position 141c according to the third embodiment of the present invention. Further understandings can be achieved by referring to FIGS. 7 and 8 together.

When the first sliding block 110c engages with the second sliding block 120c, two end poles of the first magnetic strip 112c can be stably located respectively in two positions corresponding to the spaces between the two second magnetic strips 122c. When the first sliding block 110c is disposed at the first position 141c with respect to the second sliding block 120c, the N-poles of the two second magnetic strips 122c are corresponding to and repel or push against the N-pole of the first magnetic strip 112c. Similarly, the S-poles of the two second magnetic strips 122c are corresponding to and repel or push against the S-pole of the first magnetic strip 112c. Thus, the first sliding block 110c stably stops at the first position 141c in a balance state due to the above two cases of magnetic pole repulsion being used to push against the first magnetic strip 112c.

FIG. 9 is a graphical picture showing the first sliding block 110c stops at a second position 142c according to the third embodiment of the present invention.

When the first sliding block 110c slides to the second position 142c with respect to the second sliding block 120c, the N-poles of the two second magnetic strips 122c are corresponding to and attract the S-pole of the first magnetic strip 112c. Similarly, the S-poles of the two second magnetic strips 122c are corresponding to and attract the N-pole of the first magnetic strip 112c. Therefore, the first sliding block 110c stably stops at the second position 142c in a balance state due to the above two cases of magnetic pole attraction being used to keep the first magnetic strip 112c.

Though the present invention has been disclosed above by the preferred embodiments, they are not intended to limit the present invention. Anybody skilled in the art can make some modifications and variations without departing from the spirit and scope of the present invention. Therefore, the protecting range of the present invention falls in the appended claims.

What is claimed is:

1. A multi-stage sliding structure of a handheld device, suitable for allowing a main body and a cover of the handheld device to slide with respect to each other, the structure comprising:
   a first sliding block having at least one first groove for containing a first magnetic strip;
   a second sliding block having at least one second groove adapted to match the first groove in terms of position and shape, the second groove for containing at least two second magnetic strips which are continually spaced apart in the second groove, and wherein directions of magnetic poles of the second magnetic strips correspond with directions of respective magnetic poles of the first magnetic strip, wherein the first groove, the second groove, the first magnetic strip, and the second magnetic strips are all arc-shaped with a same radian; and
   an engagement structure comprising a first structure of the first sliding block and a second structure of the second sliding block matching the first structure, wherein the two structures are disposed on outer sides of the first groove and the second groove respectively, and the engagement structure is for enabling the first and the second sliding blocks to engage with each other and slide with respect to each other.

2. The multi-stage sliding structure of a handheld device according to claim 1, wherein the first sliding block is disposed on the cover of the handheld device, and the second sliding block is disposed on the main body of the handheld device.

3. The multi-stage sliding structure of a handheld device according to claim 1, wherein the second sliding block is disposed on the cover of the handheld device, and the first sliding block is disposed on the main body of the handheld device.

4. The multi-stage sliding structure of a handheld device according to claim 1, wherein the second magnetic strips have different lengths.

5. The multi-stage sliding structure of a handheld device according to claim 1, wherein the second magnetic strips have substantially a same length.

6. A multi-stage sliding structure of a handheld device, suitable for allowing a main body and a cover of the handheld device to slide with respect to each other, the structure comprising:
   a first sliding block having a linear first groove for containing a first magnetic strip;
   a second sliding block having an annular second groove for containing two arc-shaped second magnetic strips which are opposite to each other and spaced apart in the second groove, and wherein two ends of the first magnetic strip are fit to be disposed respectively in two positions corresponding to spaces between the second magnetic strips; and
   an engagement structure comprising a first structure of the first sliding block and a second structure of the second sliding block matching the first structure, wherein the two structures are suitable for engaging with each other to enable the first sliding block to engage with the second sliding block and rotatably slide along an outer periphery of the second groove with respect to the second sliding block, such that the two ends of the first magnetic strip are fit to be stably disposed respectively in two positions corresponding to the spaces between the second magnetic strips.

7. The multi-stage sliding structure of a handheld device according to claim 6, wherein the first sliding block is disposed on the cover of the handheld device, and the second sliding block is disposed on the main body of the handheld device.

8. The multi-stage sliding structure of a handheld device according to claim 6, wherein the second sliding block is disposed on the cover of the handheld device, and the first sliding block is disposed on the main body of the handheld device.

* * * * *